(12) United States Patent
Clay, II

(10) Patent No.: US 8,405,245 B1
(45) Date of Patent: Mar. 26, 2013

(54) EMERGENCY RESPONSE STEERING WHEEL DEVICE

(76) Inventor: Jimmy Ray Clay, II, Steele, AL (US)

(\*) Notice: Subject to any disclaimer, the term of this patent is extended or adjusted under 35 U.S.C. 154(b) by 390 days.

(21) Appl. No.: 12/878,300

(22) Filed: Sep. 9, 2010

(51) Int. Cl.
*B60L 1/00* (2006.01)
*B60L 3/00* (2006.01)
*H02G 3/00* (2006.01)

(52) U.S. Cl. ...................................... 307/10.1

(58) Field of Classification Search ............ 307/10.1; 200/61.54; 701/36, 41
See application file for complete search history.

(56) References Cited

U.S. PATENT DOCUMENTS

| | | | |
|---|---|---|---|
| D254,486 S | 3/1980 | Montgomery et al. | |
| 5,949,149 A | 9/1999 | Shitanaka et al. | |
| 6,349,616 B1 | 2/2002 | Onodera et al. | |
| 6,548,772 B2 | 4/2003 | Liburdi | |
| 6,639,160 B2 | 10/2003 | Ibe et al. | |
| 6,768,067 B2 | 7/2004 | Adachi et al. | |
| 6,928,350 B2 * | 8/2005 | Melnyk et al. | 701/36 |
| 7,119,290 B2 | 10/2006 | Kim | |
| 7,126,583 B1 | 10/2006 | Breed | |
| 7,132,976 B2 | 11/2006 | Shinoda et al. | |
| 7,134,360 B2 | 11/2006 | Schütz | |

\* cited by examiner

*Primary Examiner* — Carlos Amaya

(57) ABSTRACT

An emergency response steering wheel device featuring a plurality of push-to-talk (PTT) buttons and control buttons disposed on a steering wheel including a radio button, a volume button, a camera button, a spotlight button, an emergency flasher light button, a siren button, and a public address (PA) system button; wiring and a break-out box each housed in the steering wheel for operatively connecting the control buttons to a radio, a volume system, a camera, a spotlight, an emergency flasher light, a siren, and a public address (PA) system, respectively; and a center console comprising a plurality of console controls, the consol controls include a radio button, a volume button, a camera button, a spotlight button, an emergency flasher light button, a siren button, and a public address (PA) system button.

6 Claims, 2 Drawing Sheets

EMERGENCY RESPONSE STEERING WHEEL DEVICE

FIELD OF THE INVENTION

The present invention is directed to vehicle steering wheels, more particularly to a steering wheel equipped with means of accessing emergency services (e.g., in emergency vehicles).

BACKGROUND OF THE INVENTION

Drivers of emergency vehicles often need to have both hands on the steering wheel while driving. However, they also may need to be able to engage in communications at the same time. The present invention features an emergency response steering wheel device, which allows a driver to access special control buttons on the vehicle steering wheel for communications. In some embodiments the steering wheel device comprises a set of push-to-talk buttons, control buttons, display buttons, a console, and a set of console controls. The device of the present invention may improve driver safety by allowing the driver to multi-task while keeping both his/her hands on the steering wheel at all times during emergency vehicle operation.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features an emergency response steering wheel device. In some embodiments, the device comprises a steering wheel and steering wheel column attached to a dash of a vehicle; a plurality of push-to-talk (PTT) buttons disposed on the steering wheel; a plurality of control buttons disposed on the steering wheel, the control buttons include a radio change button, a volume control button, a camera activation button, a spotlight activation button, an emergency flasher light activation button, a siren activation button, and a public address (PA) system activation button; and wiring and a break-out box each housed in the steering wheel and steering wheel column for operatively connecting the control buttons of the steering wheel to a radio, a volume system, a camera, a spotlight, an emergency flasher light, a siren, and a public address (PA) system, respectively. In some embodiments, the device comprises a speaker-microphone module disposed on the steering wheel or the steering wheel column, the speaker-microphone module being operatively connected to the PTT buttons, to the volume control buttons, and to the PA system activation button. In some embodiments, the device comprises a center console comprising a plurality of console controls, the consol controls include a radio change button, a volume control button, a camera activation button, a spotlight activation button, an emergency flasher light activation button, a siren activation button, and a public address (PA) system activation button; and wiring and a break-out box housed in the center console for operatively connecting the consol controls to the radio, the volume system, the camera, the spotlight, the emergency flasher light, the siren, and the public address (PA) system, respectively.

In some embodiments, the PTT buttons include a first PTT button is disposed at a 10 o'clock position on the steering wheel, a second PTT button disposed at a 2 o'clock position on the steering wheel, a third PTT button disposed at a 8 o'clock position on the steering wheel, and a fourth PTT button disposed at a 4 o'clock position on the steering wheel. In some embodiments, one or more control buttons of the steering wheel comprise illumination labels that can be illuminated for nighttime use. In some embodiments, the device further comprises a laptop operatively connected to the center console. In some embodiments, the console comprises a monitor. In some embodiments, the console comprises a USB port or a connection for a music player.

DESCRIPTION OF PREFERRED EMBODIMENTS

Referring now to FIGS. 1-4, the present invention features an emergency response steering wheel device 100, which allows a driver to access special control buttons on the vehicle steering wheel for communications. The device of the present invention may improve driver safety by allowing the driver to multi-task while keeping both his/her hands on the steering wheel at all times during emergency vehicle operation.

Figure 1:
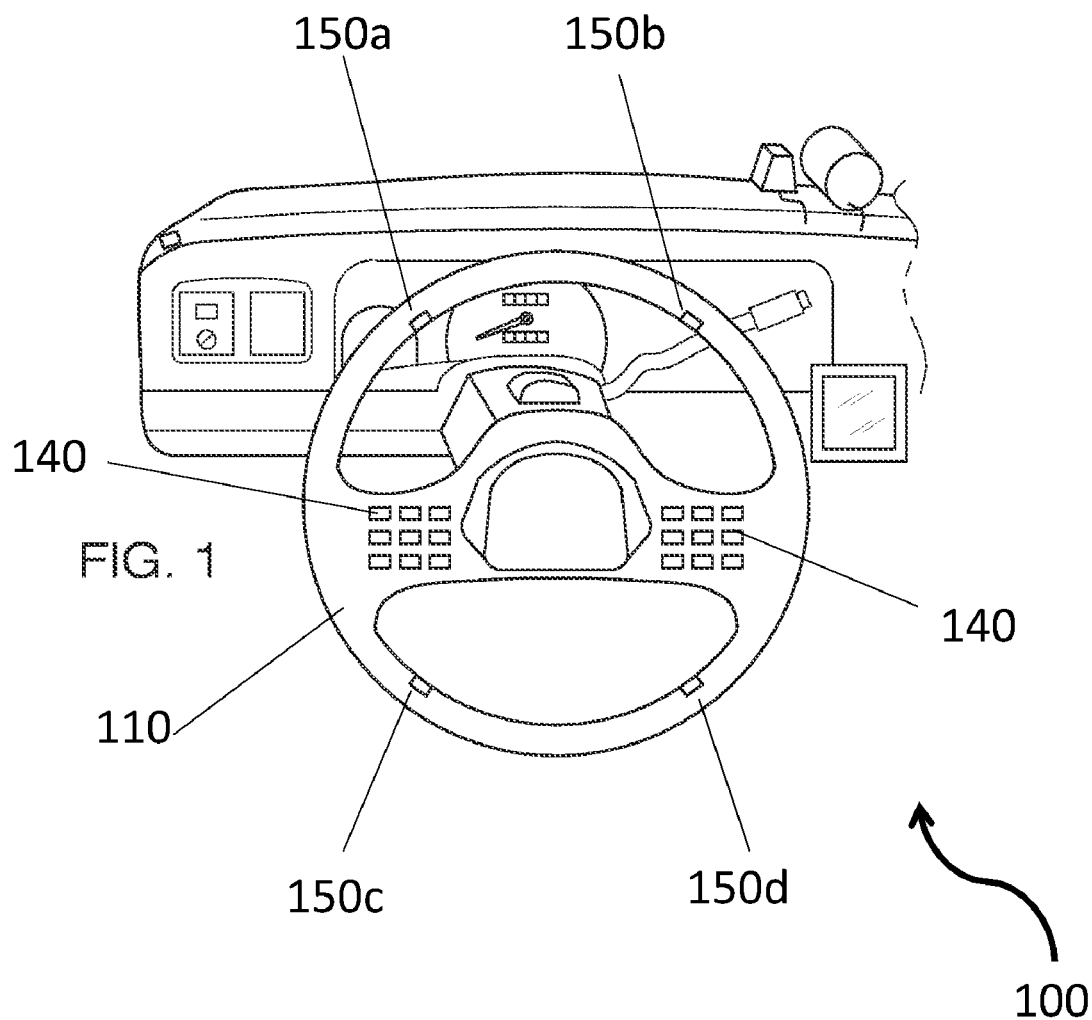
FIG. 1 is a front view of an emergency response steering wheel of the present invention.
Figure 2:
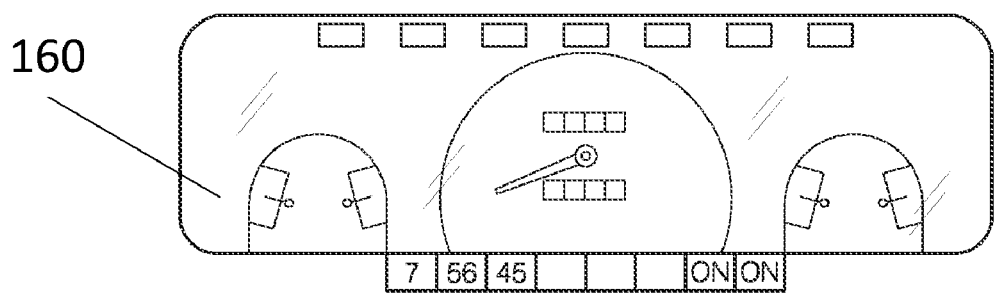
FIG. 2 is a front view of the display located on the dash of a vehicle.

As shown in FIG. 1, the steering wheel device 100 of the present invention comprises a steering wheel 110 (e.g., retrofit steering wheel) and a steering wheel column, which are similar to standard steering wheels well known to one of ordinary skill in the art. The steering wheel 110 and column are attached to the dash of the vehicle.

Disposed on the steering wheel 110 is a plurality of push-to-talk (PTT) buttons. For example, a first PTT button 150a is disposed at a 10 o'clock position on the steering wheel 110, a second PTT button 150b is disposed at a 2 o'clock position on the steering wheel 110, a third PTT button 150c is disposed at a 8 o'clock position on the steering wheel 110, and a fourth PTT button 150d is disposed at a 4 o'clock position on the steering wheel 110. The PTT buttons are not limited to this configuration. The PTT buttons 150 provide a means of two-way communications.

In some embodiments, the device 100 further comprises a speaker-microphone module. In some embodiments, the module is mounted to steering wheel column or is integrated into the steering wheel 110.

A plurality of control buttons 140 is disposed on the steering wheel 110 (e.g., left, central, or right portion of the steering wheel 110), for example as shown in FIG. 1. The control buttons 140 may include but are not limited to radio change buttons, volume control buttons, start and stop in-vehicle camcorder buttons, on and off buttons for the spotlight and/or emergency flasher lights, on and off buttons for the speed control radar, on and off buttons for the siren, on and off buttons for the public address system, and the like. In some embodiments, the control buttons 140 comprise illumination labels that can be illuminated for nighttime use. The illumination labels may operate in tandem with the instrument cluster lighting. In some embodiments, a display 160 is mounted to the steering column or under the instrument cluster to indicate the enabled button settings on the steering wheel (see FIG. 2).

Wiring and a wiring housing are housed in the steering wheel 110 and column. In some embodiments, a break-out box or other wiring harness connector arrangement is located under the dash to make the appropriate interface connections to the emergency services equipment. Each steering wheel control function is wired in parallel with the respective emergency services equipment button.

Figure 3:
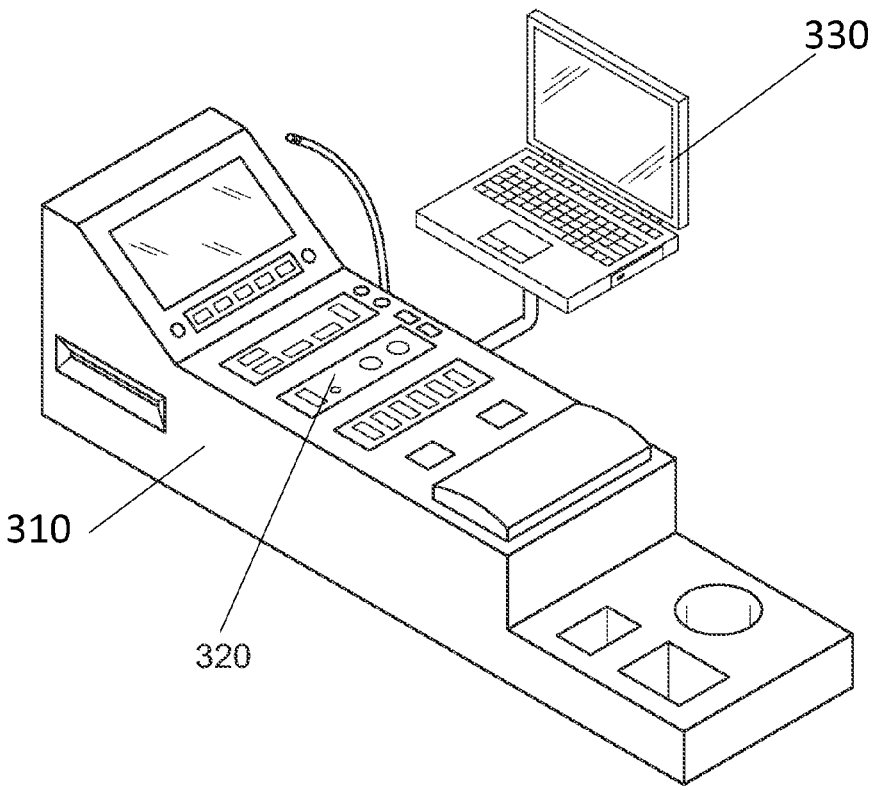
FIG. 3 is a perspective view of a center console.

Referring now to FIG. 3, the device of the present invention may further comprise a center console 310 with a set of console controls 320. A break-out box or other wiring harness connector arrangement may be located under the dash to make the appropriate interface connections to center console 310. Each steering wheel control function is wired in parallel with the console control 320. In some embodiments, a laptop 330 may be operatively connected to center console 310 for integration. In some embodiments, the console controls 320 correspond to buttons located on steering wheel 110. In some embodiments, the console 310 comprises a monitor. In some embodiments, the console 310 comprises buttons for controlling a radio, sirens, lights, the monitor, a GPS system, a camera and/or the like. In some embodiments, the console comprises a USB port and/or a connection for a music player.

Figure 4:
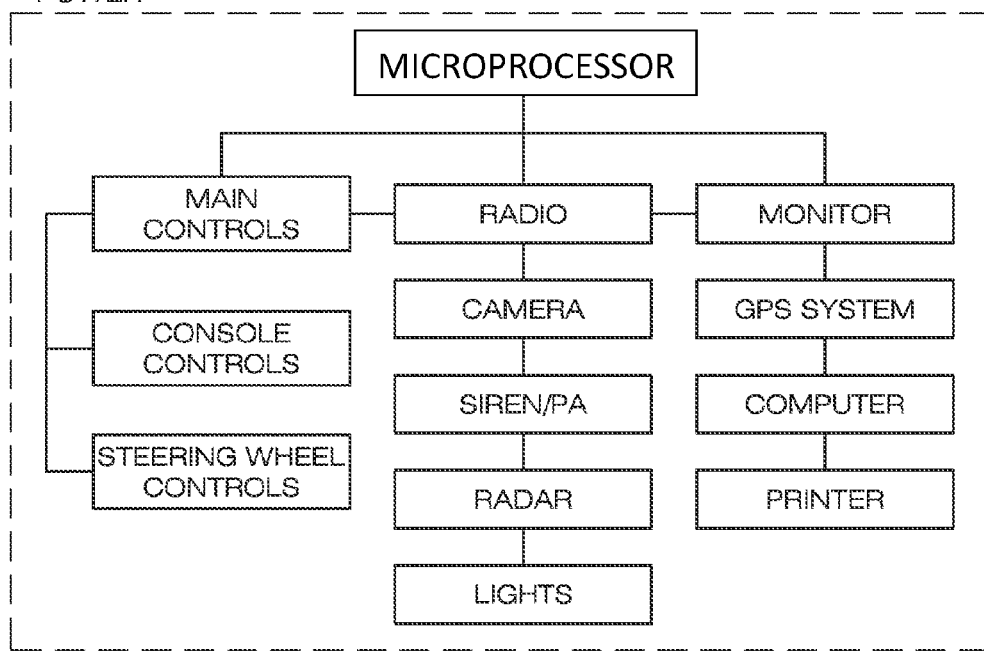
FIG. 4 is a schematic representation of electrical components of the emergency response steering wheel device of the present invention.

Referring now to FIG. 4, the device 100 of the present invention comprises a microprocessor operatively connected to other components of the device, for example the buttons 145, 150, and the control controls 320. In some embodiments, the microprocessor is operatively connected to one or more o the following: a radio, a camera, a siren/PA, a radar system, lights, a monitor (e.g., of the console 310), a GPS system, a laptop (e.g., with printer).

The disclosures of the following U.S. Patents are incorporated in their entirety by reference herein: U.S. Pat. No. 6,768,067; U.S. Pat, No. 7,119,290; U.S. Pat. No. 7,126,583; U.S. Pat. No. 6,349,616; U.S. Pat. No. 6,639,160; U.S. Pat. No. 6,548,772; U.S. Pat. No. 7,134,360; U.S. Pat. No. 7,132,976; U.S. Pat. No. 5,949,149.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An emergency response steering wheel device comprising:
   (a) a steering wheel and steering wheel column attached to a dash of a vehicle;
   (b) a plurality of push-to-talk (PTT) buttons disposed on the steering wheel;
   (c) a plurality of control buttons disposed on the steering wheel, the control buttons include a radio change button, a volume control button, a camera activation button, a spotlight activation button, an emergency flasher light activation button, a siren activation button, and a public address (PA) system activation button;
   (d) wiring and a break-out box each housed in the steering wheel and steering wheel column for operatively connecting the control buttons of the steering wheel to a radio, a volume system, a camera, a spotlight, an emergency flasher light, a siren, and a public address (PA) system, respectively;
   (e) a speaker-microphone module disposed on the steering wheel or the steering wheel column, the speaker-microphone module being operatively connected to the PTT buttons, to the volume control buttons, and to the PA system activation button;
   (f) a center console comprising a plurality of console controls, the consol controls include a radio change button, a volume control button, a camera activation button, a spotlight activation button, an emergency flasher light activation button, a siren activation button, and a public address (PA) system activation button; and
   (g) wiring and a break-out box housed in the center console for operatively connecting the consol controls to the radio, the volume system, the camera, the spotlight, the emergency flasher light, the siren, and the public address (PA) system, respectively.

2. The steering wheel device of claim 1, wherein the PTT buttons include a first PTT button is disposed at a 10 o'clock position on the steering wheel, a second PTT button disposed at a 2 o'clock position on the steering wheel, a third PTT button disposed at a 8 o'clock position on the steering wheel, and a fourth PTT button disposed at a 4 o'clock position on the steering wheel.

3. The steering wheel device of claim 1, wherein one or more control buttons of the steering wheel comprise illumination labels that can be illuminated for night time use.

4. The steering wheel device of claim 1 further comprising a laptop operatively connected to the center console.

5. The steering wheel device of claim 1, wherein the console comprises a monitor.

6. The steering wheel device of claim 1, wherein the console comprises a USB port or a connection for a music player.

* * * * *